(12) United States Patent
Rimchala et al.

(10) Patent No.: US 11,216,660 B2
(45) Date of Patent: Jan. 4, 2022

(54) SYSTEM AND METHOD OF PERFORMING PATCH-BASED DOCUMENT SEGMENTATION FOR INFORMATION EXTRACTION

(71) Applicant: Intuit Inc., Mountain View, CA (US)

(72) Inventors: Tharathorn Rimchala, Mountain View, CA (US); Yang Li, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 203 days.

(21) Appl. No.: 16/556,797

(22) Filed: Aug. 30, 2019

(65) Prior Publication Data

US 2021/0064865 A1    Mar. 4, 2021

(51) Int. Cl.

| | |
|---|---|
| *G06K 9/00* | (2006.01) |
| *G06T 7/11* | (2017.01) |
| *G06K 9/38* | (2006.01) |
| *G06K 9/48* | (2006.01) |
| *G06K 9/46* | (2006.01) |
| *G06F 3/14* | (2006.01) |
| *G06N 20/00* | (2019.01) |

(52) U.S. Cl.
CPC .......... *G06K 9/00463* (2013.01); *G06F 3/14* (2013.01); *G06K 9/00449* (2013.01); *G06K 9/00469* (2013.01); *G06K 9/38* (2013.01); *G06K 9/4609* (2013.01); *G06K 9/4661* (2013.01); *G06K 9/48* (2013.01); *G06N 20/00* (2019.01); *G06T 7/11* (2017.01); *G06K 2209/01* (2013.01); *G06T 2207/10008* (2013.01); *G06T 2207/30176* (2013.01)

(58) Field of Classification Search
CPC .......... G06K 9/00449; G06K 9/00463; G06K 9/00469; G06K 9/38; G06K 9/48; G06K 9/4609; G06K 9/4661; G06K 2209/01; G06T 7/11; G06T 2207/10008; G06T 2207/30176; G06N 20/00
USPC .................................................. 382/159, 190
See application file for complete search history.

(56) References Cited

U.S. PATENT DOCUMENTS

2021/0012102 A1*    1/2021    Cristescu ................ G06F 16/56

OTHER PUBLICATIONS

Suzuki, "Topological Structural Analysis of Digitized Binary Images by Border Following", Computer Vision, Graphics, and Image Processing, vol. 30, pp. 32-46, 1985.
Sauvola et al., "Adaptive Document Image Binarization", Pattern Recognition, vol. 33, pp. 225-236, 2000.

* cited by examiner

*Primary Examiner* — Daniel G Mariam
(74) *Attorney, Agent, or Firm* — DLA Piper LLP (US)

(57) ABSTRACT

A user device associated with a user may receive a document associated with the user. The user device may encrypt the received document. The user device may perform patch-based document segmentation on the received document to form a plurality of patches on the received document. The user device may extract text from each patch of the plurality of patches. The user device may analyze the extracted text from each patch to detect a field title and a field value. The user device may encrypt the extracted text and its associated field value for each patch of the plurality of patches. The user device may send the encrypted extracted text and its associated field value to the user device and instructions to display the extracted text and its associated field value on a user interface.

20 Claims, 10 Drawing Sheets

SYSTEM AND METHOD OF PERFORMING PATCH-BASED DOCUMENT SEGMENTATION FOR INFORMATION EXTRACTION

BACKGROUND OF THE DISCLOSURE

Manual data entry can be a very time-consuming and error prone process. It can be especially tedious for the users or customers that have a large number of forms and documents from which the data needed to be entered (e.g. entering tax form information into a tax filing software) into an application or browser on their computer. However, by allowing users to upload documents/forms, with either printed or handwritten information on them, and accurately extracting the necessary information from these documents, time can be saved and errors can be avoided that would traditionally be difficult to notice and correct.

Existing solutions at extracting information from documents are not robust enough and are not capable of handling wide variants of document inputs. Many frameworks are unable to manage and cannot replace manually entered and generated labelled data.

BRIEF DESCRIPTION OF THE FIGURES

FIGS. 5A and 5B show an example of a binarized image of an example document (using synthetic data that does not contain a real identity), according to an embodiment of the present disclosure.

FIGS. 6A and 6B show an example of an image of an example document with synthetic data that has had undesired contours filtered out, according to an embodiment of the present disclosure.

FIGS. 7A and 7B show an example of an image of an example document with synthetic data with generated vertices, according to an embodiment of the present disclosure.

FIGS. 8A and 8B show an example of an image of an example document with synthetic data with patches constructed, according to an embodiment of the present disclosure.

DETAILED DESCRIPTION OF SEVERAL EMBODIMENTS

Embodiments of the present disclosure relate to systems and methods for performing contour-based patch detection and key-value detection for information extraction in structured documents. This method may be used to automatically, accurately, and securely extract information from a form or document uploaded by a user. In an example embodiment, when a user or customer needs to enter information into a tax preparation or accounting software, the customer may photograph or scan their tax forms and upload them directly into tax filing software, instead of manually filling out a variety of fields on the application or website. The system may extract relevant information from the uploaded documents. Without patch spatial information and key-value detection, a whole document text output from an OCR engine resembles a bag of characters. In structured documents, patch information may provide additional features to information extraction models that may significantly improve the overall information extraction accuracy. Once the information is extracted, the system may display the extracted information on an electronic version of the document on a user interface. The customer may then edit any information on the electronic document.

Figure 1:
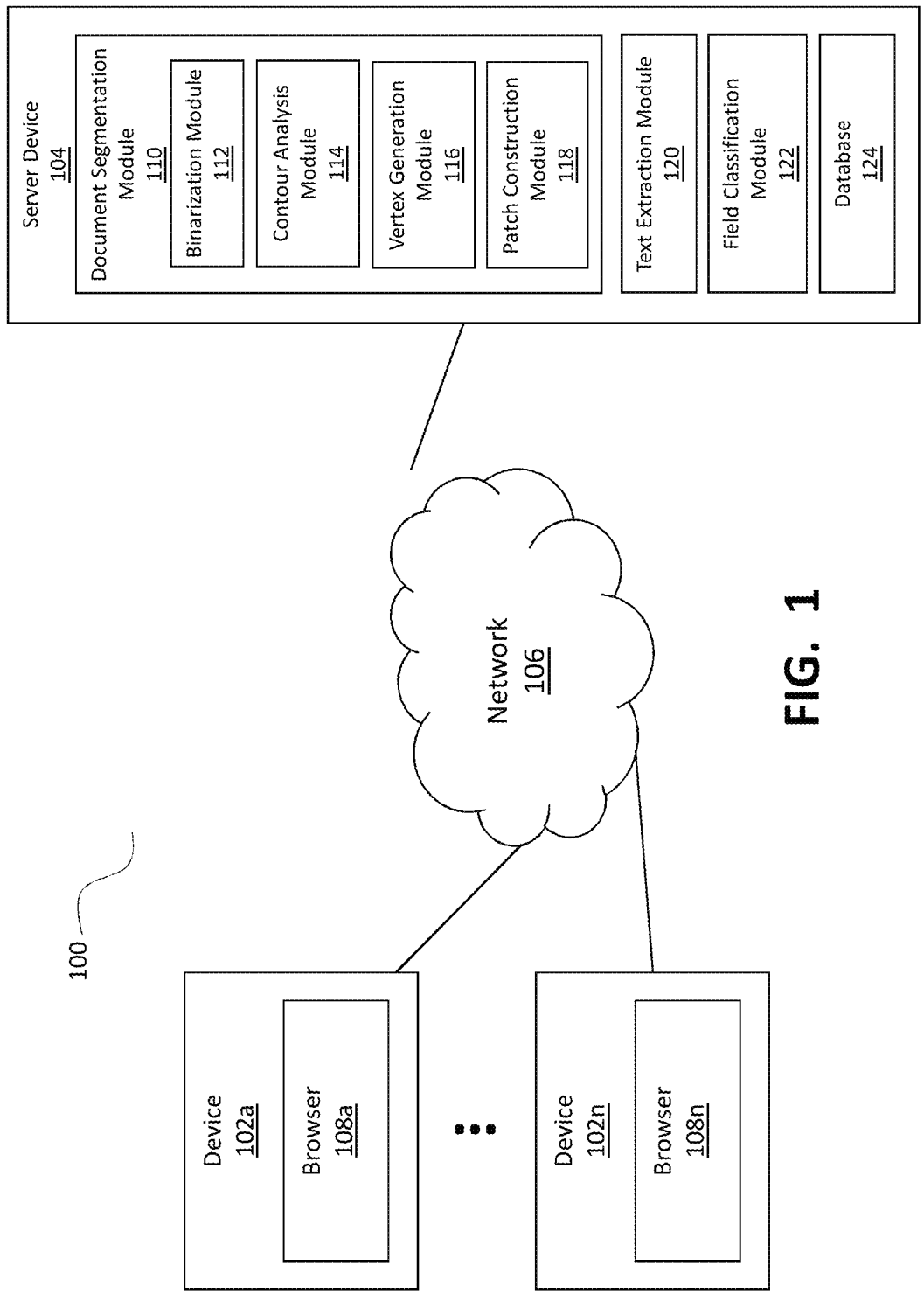
FIG. 1 is a block diagram of an example system for performing patch-based document segmentation for information extraction, according to an embodiment of the present disclosure.

FIG. 1 is a block diagram of an example system 100 for performing patch based document segmentation for information extraction, according to an embodiment of the present disclosure. System 100 may include one or more devices 102a, . . . , 102n (102 generally) communicably coupled to server device 104 via network 106.

Server device 104 may include any combination of one or more web servers, mainframe computers, general-purpose computers, personal computers, or other types of computing devices. Server device 104 may represent distributed servers that are remotely located and communicate over a communications network, or over a dedicated network such as a local area network (LAN). Server device 104 may also include one or more back-end servers for carrying out one or more aspects of the present disclosure. In some embodiments, server device 104 may be the same as or similar to device 900 described below in the context of FIG. 9.

As shown in FIG. 1, server device 104 may include document segmentation module 110, text extraction module 120, field classification module 122, and database 124. In some embodiments, server device 104 may be configured to receive documents from device 102 via network 106. In some embodiments, server device 104 may be configured to encrypt documents received from device 102 and securely store them in database 124. Server device 104 may also be configured to send encrypted information to user device 102 via network 106. In some embodiments, document segmentation module 110 may be configured to perform patch-based document segmentation on a document received from user device 102. In some embodiments, document segmentation module 110 may be configured to detect patches on a document and send these patches to text extraction module 120. Text extraction module 120 may be configured to detect characters in the typed or handwritten text in the detected patches. In some embodiments, text extraction module 120 may be configured to send text converted to machine readable format to field classification module 122. Field classification module 122 may be configured to analyze the information received from text extraction module 120 and classify them into different field types and demarcate the characters that are part of field title and a field value. The various system components—such as modules 110, 112, 114, 116, 118, 120, and 122—may be implemented using hardware and/or software configured to perform and execute the processes, steps, or other functionality described in conjunction therewith.

Form segmentation module 110 may include binarization module 112, contour analysis module 114, vertex generation module 116, and patch construction module 118. In some embodiments, binarization module 112 may be configured to perform binarization of a document or image of a document. A binarization process may be used to classify each pixel into foreground and background. For example, on a grey-scale, if a pixel's intensity is above a certain threshold intensity, it may be assigned an intensity of 1 (white, indicating background). If the pixel intensity is below the threshold intensity, it may be given an intensity of 0 (black, indicating foreground). The resulting image with the binarized pixels is a "binarized image". In some embodiments, binarization module 112 may be configured to apply several adaptive thresholding methods to a document, including Sauvola-Thresholding, to achieve a clean binarized image. In some embodiments, binarization module 112 may be configured to perform non-adaptive binarization techniques, or any variety of binarization techniques. Binarization module 112 may also be configured to send a binarized document to contour analysis module 114. Contour analysis module 114 may be configured to generate contours on a document. Contours may be collections of edges, where an edge is a collection of pixels with at least one neighboring pixel being assigned a different binarization value, or streaks, where a streak is a collection of edges that form the same line. Streaks may be used in future processing steps to generate vertices and thus patches enclosing entities to be extracted (such as table cells or form fields) in the document. In general, a patch may be any unit into which a document is broken up to simplify processing and increase accuracy; each patch may then be individually analyzed. In some embodiments, patches may be formed on a grid of vertices and generated contours on the document. In some embodiments, the patches may be rectangular. Examples of patches may be found in FIG. 8B and are discussed below in relation to FIG. 8B. In some embodiments, the document may be the document received from binarization module 112. In some embodiments, contour analysis module 114 may be configured to generate raw contours using methods similar to or the same as those disclosed in "Topological Structural Analysis" by Suzuki et al. (1985), which is herein incorporated by reference in its entirety and attached hereto as Appendix I. Suzuki discloses a border following technique that may allow a binary image to be converted into a version with recognized borders/contours. The technique may discriminate between types of borders (inner vs. outer) and determine if certain borders surround other borders or components, extracting relations between them. This technique may offer an effective way of storing binary image data. Contour analysis module 114 may be configured to identify shapes formed by the raw contours, analyze the shapes and their spans, and filter out contours that form atypical shapes or have undesired spans. Contour analysis module 114 may also be configured to send a document or image of a document with generated contours to vertex generation module 116.

Vertex generation module 116 may be configured to generate vertices on a document. Vertices may be used in conjunction with generated contours to form patches that may correspond to data entry boxes on a document or the like. In some embodiments, this document may be the document received from contour analysis module 114, a document with contours generated on it. Vertex generation module 116 may be configured to use the contours analyzed and selected by contour analysis module 114 to generate vertices. In some embodiments, vertex generation module 116 may be configured to send a document with a grid of generated vertices to patch construction module 118. Patch construction module 118 may be configured to construct patches on a document. In some embodiments, this document may be a document received from vertex generation module 116. Patch construction module 118 may be configured to construct patches based on the document. As noted above, in some embodiments, patches may be formed on a grid of vertices and generated contours on the document. In some embodiments, the patches may be rectangular. In some embodiments, patch construction module 118 may be configured to label, either explicitly or implicitly, each generated patch with a number. In some embodiments, patch construction module 118 may be configured to send a document with constructed patches to text extraction module 120.

Device 102 may include one or more computing devices capable of receiving user input as well as transmitting and/or receiving data via network 106 or communicating with server device 104. In some embodiments, user device 102 may include a conventional computer system, such as a desktop or laptop computer. Alternatively, user device 102 may include a device having computer functionality, such as a personal digital assistant (PDA), a mobile telephone, a smartphone, or other suitable device. User device 102 may be configured to send documents via network 106 to server device 104. In some embodiments, user device 102 may also be configured to receive encrypted information and display an electronic version of the originally uploaded document with values that have been extracted from the original document.

Network 106 may include one or more wide area networks (WANs), metropolitan area networks (MANs), local area networks (LANs), personal area networks (PANs), or any combination of these networks. Network 106 may include a combination of one or more types of networks such as Internet, intranet, Ethernet, twisted-pair, coaxial cable, fiber optic, cellular, satellite, IEEE 8011.11, terrestrial, and/or other types of wired or wireless networks. Network 106 may also use standard communication technologies and/or protocols.

Figure 2:
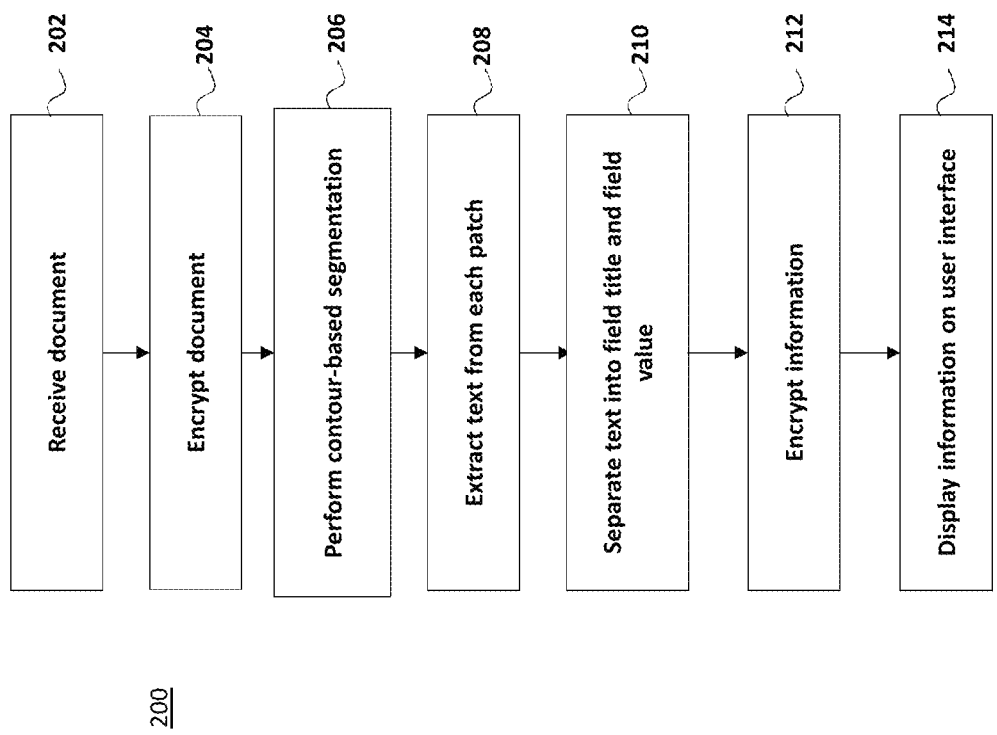
FIG. 2 is a flow diagram showing processing that may occur to perform patch-based document segmentation for information extraction, according to an embodiment of the present disclosure.

FIG. 2 is a flow diagram showing a process 200 to perform patch-based document segmentation for information extraction, according to an embodiment of the present disclosure. In some embodiments, process 200 may be performed by server device 104 of FIG. 1. At block 202, a document may be received. In some embodiments, the document may be received by a server device 104 from user device 102. In some embodiments, the document may be a tax form with handwritten or typed information on it. The document may be in PDF format, a Word document format, or any similar format. In some embodiments, an image of the document may be received. The image format may be an image file such as TIFF, JPEG, or PNG, a Portable Document Format (PDF) file, or the like. In some embodiments, the document may be submitted via a web browser or an application on a user device. At block 204, the document or image of the document may be encrypted. In the case that the documents are tax forms or other financial documents, the documents may possess sensitive information and thus it may be necessary for the documents to be encrypted for customer's data security. At block 206, patch-based segmentation may be performed on the received document. This step may return a collection of patches detected on the document. In some embodiments, these patches may correspond to forms or fields on the document—such as the field on a tax form where field information such as name, social security number, wages are populated—or table cell in a financial document with tabular structure. In some embodiments, this step may be performed by document segmentation module 110 of FIG. 1.

At block 208, text may be extracted from each patch of the document. In some embodiments, the document with patches may be sent from document segmentation module 110 to text extraction module 120, and text extraction module 120 may perform the text extraction on each patch individually. In some embodiments, text extraction may be performed by an OCR engine. At block 210, the extracted text of each patch may be separated into a field title and a field value. For example, if the text extracted from a patch was "Wages Amount $65,000", "Wages Amount" may be determined to be the field title and $65,000" may be determined to be the field value. This step may be performed for the text extracted from each patch of the document. In some embodiments, this step may be performed by field classification module 122 on a document received from text extraction module 120. In some embodiments, field classification module 122 may employ a machine learning model that has been trained to predict which words in a patch correspond to field title and which words in a patch correspond to a field value. In some embodiments, this machine learning model is trained on both textual features and spatial coordinates. At block 212, the extracted text and classified field values may be encrypted. In some embodiments, this step may be performed by server device 104. At block 214, the encrypted information may be sent to a user device and displayed on a user interface associated with the user device. In some embodiments, the user interface will display an electronic version of the document populated with the extracted values from the user's original document. In some embodiments, the customer may be shown the electronic document side by side with an image of the document originally submitted and may have the ability to edit the extracted information. In some embodiments, this may be displayed on user device 102.

Figure 3:
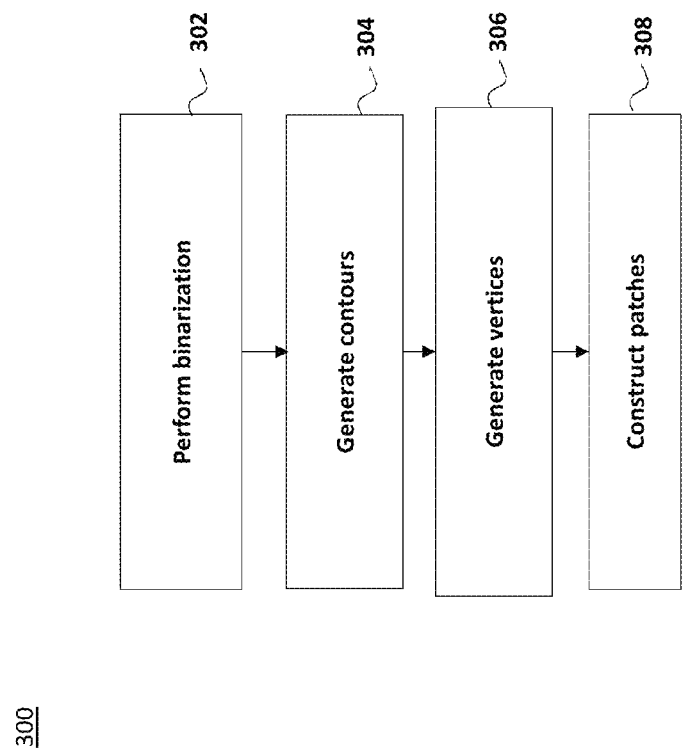
FIG. 3 is a flow diagram showing processing that may occur to perform patch-based document segmentation, according to an embodiment of the present disclosure.

FIG. 3 is a flow diagram showing process 300 to perform patch-based document segmentation, according to an embodiment of the present disclosure. In some embodiments, process 300 may be performed by document segmentation module 110 of FIG. 1. In some embodiments, process 300 may be performed on a document received from a user device, e.g. user device 102. At block 302, a document may be binarized, i.e. may have a binarization process applied to it. In some embodiments, this step may be performed by binarization module 112. A binarization process may be used to classify each pixel on a binary system to enhance the performance of the contour analysis module. For example, on a greyscale, if a pixel's intensity is above a certain threshold intensity, it may be assigned an intensity of 1 (white). If the pixel intensity is below the intensity threshold, it may be given an intensity of 0 (black). The resulting image with the binarized pixels is a "binarized image". In some embodiments, a non-adaptive binarization technique may be used for step 302, where a global threshold intensity value is applied to the entire image. Adaptive binarization techniques may also be employed, where local threshold intensity values are determined at various regions in the image. In some embodiments, Sauvola-Thresholding adaptive binarization may be employed in a manner according to "Adaptive Document Image Binarization" et al. Sauvola (2000), which is herein incorporated by reference in its entirety and attached hereto as Appendix II. This technique may reduce noise in the received images caused by complicated lighting conditions and may boost quality of the image for document processing.

At block 304, contours may be generated on the binarized image. In some embodiments, this step may be performed by contour analysis module 114. As discussed in relation to FIG. 1, border following techniques similar to or the same as described in "Topological Structural Analysis" by Suzuki et al. (1985) may be applied. This technique may be summarized as follows. Contour analysis module 114 may generate raw contours on the image and, by analyzing the shapes formed by the raw contours, including their spans and dimensions, filter out contours that trace undesired shapes—shapes that are atypical of form fields or table cells in structured documents. Examples of atypical shapes may include shapes with rounded edges, greater than or fewer than four edges, or edges that do not intersect. In some embodiments, raw contours may be generated by analyzing the pixel gradients (of image intensity) of the image. A gradient threshold may be used; if a gradient surpasses a gradient detection threshold, then the set of pixels may be classified as an edge. In some embodiments, a desired shape may be a rectangular shape with aspect ratio within an acceptable variation from those observed in typical form fields and table cells in structured documents. At block 306, vertices are generated on the binarized image. In some embodiments, this step may be performed by vertex generation module 116. In some embodiments, the generated vertices may be generated in the form of a grid. In some embodiments, the vertices may be generated by analyzing the contours generated in step 304 and the intensity of the pixels in the image. Further details of the vertex generation step are discussed below in relation to FIG. 4. At block 308, a plurality of patches are constructed on the image. In some embodiments, this step may be performed by patch construction module 118. In some embodiments, the constructed patches may be rectangles that may correspond to boxes or form entries on a document. In some embodiments, the patches may be constructed by analyzing vertices generated in step 306 and information about contours around each vertex. The contours may be contours generated in step 304.

Figure 4:
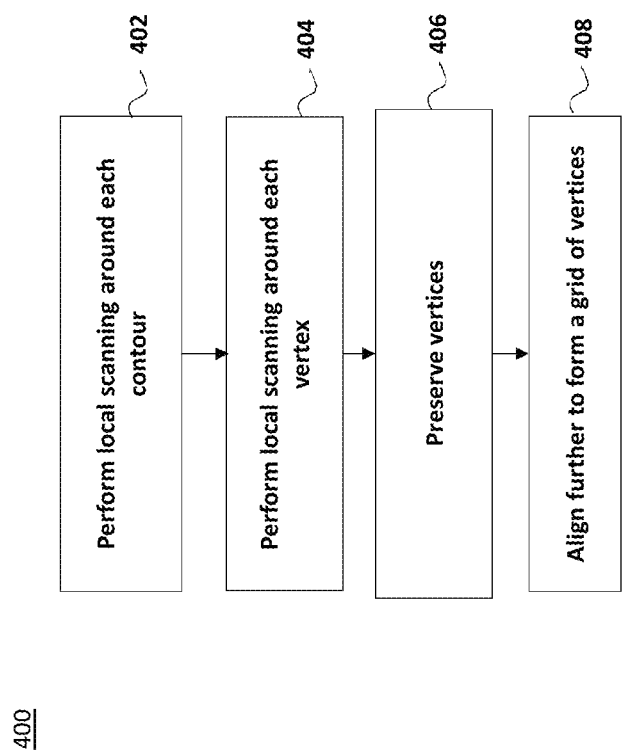
FIG. 4 is a flow diagram showing processing that may occur to generate vertices, according to an embodiment of the present disclosure.

FIG. 4 is a flow diagram showing process 400 that may occur to generate vertices, according to an embodiment of the present disclosure. In some embodiments, process 400 may be performed by vertex generation module 116. At block 402, local scanning around each contour part is performed to detect streaks (collections of contours that are likely part of the same line). In some embodiments, a streak may be a collection of edges that have the same line orientation and are within a small gap distance relative to the line length of each other. This small gap distance may be pre-defined. Edges may be fused together to form a streak. In some embodiments, these contours may be the contours generated in step 304 of process 300. At block 404, local scanning may be performed in the region around each vertex generated in step 306 above. At block 408, vertices that are in proximity of streaks in their respective surrounding regions may be preserved. For example, if a vertex is too far from a set of streaks then it may be considered an isolated vertex that may not be assigned to a patch in a structured document. An example of an acceptable set of streaks around a vertex may be streaks intersecting each other perpendicularly. At block 410, preserved vertices may be aligned to form a grid of vertices.

Figures 5A, 5B:
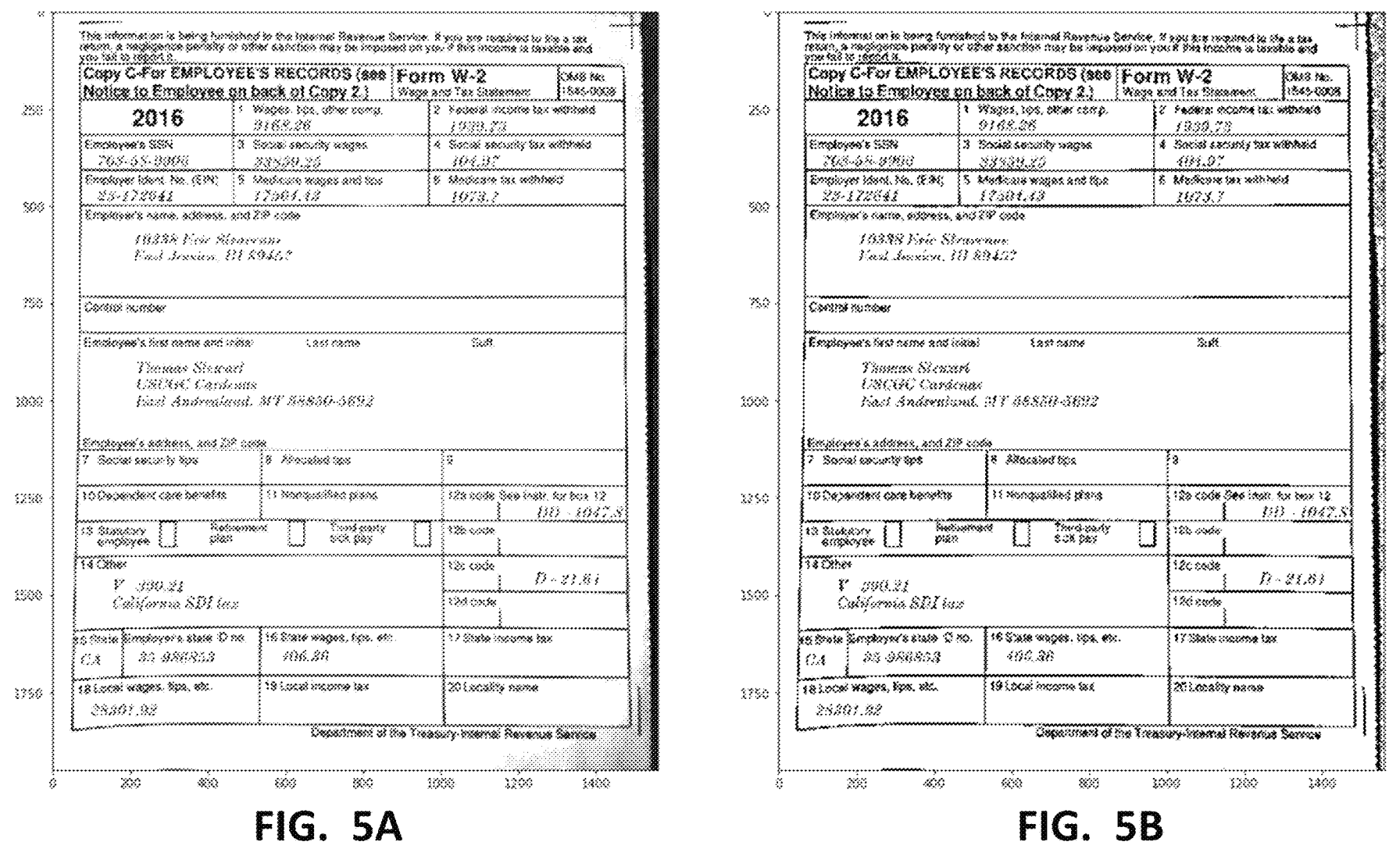

FIGS. 5A and 5B show an example of a binarized image of an example document (using synthetic data that does not contain a real identity), according to an embodiment of the present disclosure. FIG. 5A may be a document, or an image of a document. Shade spots or variations in lighting may affect the performance of the contour generation module. FIG. 5B shows what a document may look like after undergoing a binarization process, such as in block 302 of FIG. 3. Every pixel in FIG. 5B may be assigned 1 of 2 pixel values, in the same or a similar manner as discussed in relation to 302 of FIG. 3.

Figures 6A, 6B:
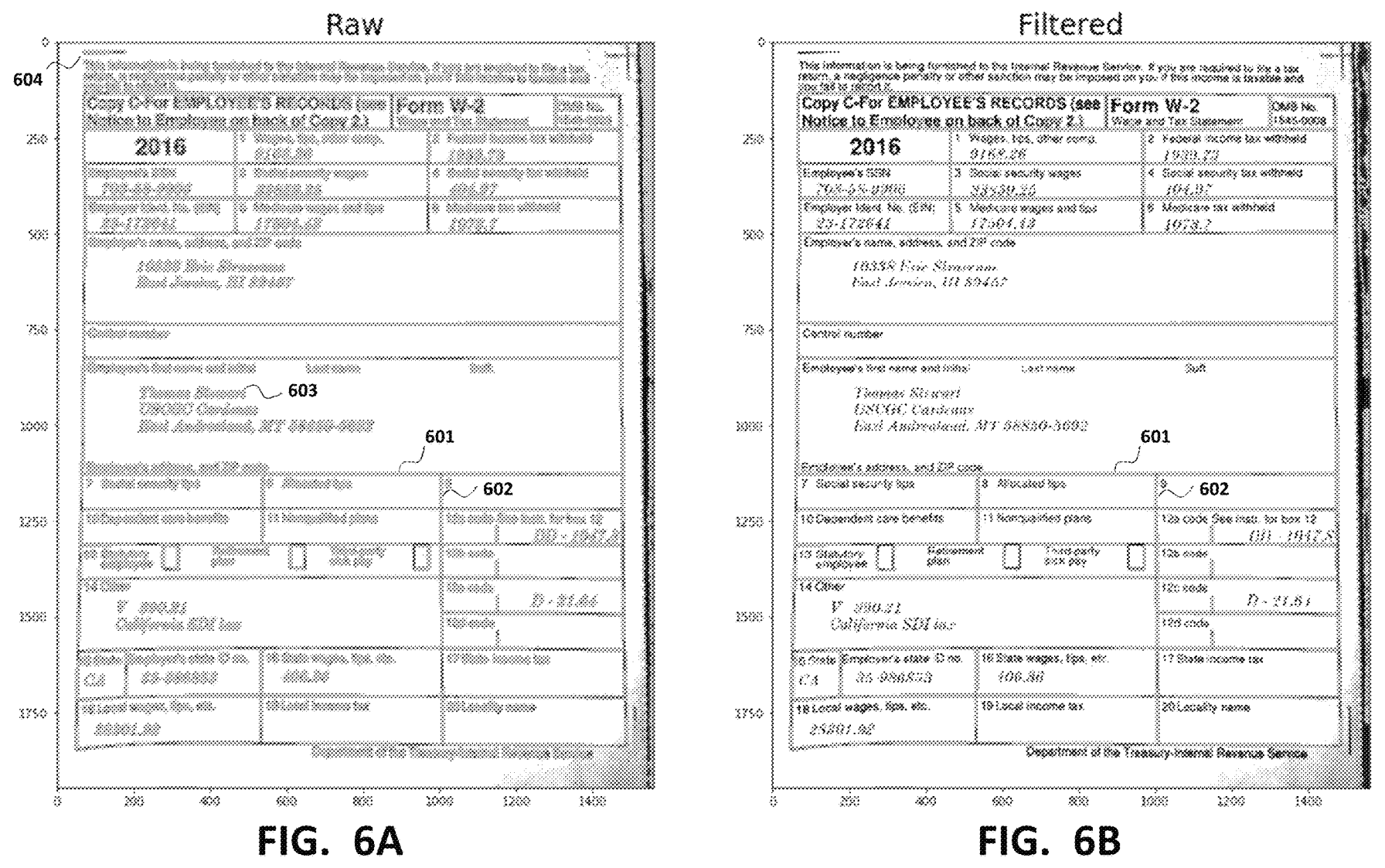

FIGS. 6A and 6B show an example of an image of an example document with synthetic data that has had undesired contours filtered out, according to an embodiment of the present disclosure. FIG. 6A may be a document or image of a document that has had raw contours generated on it via a process the same as or similar to block 304, as discussed in relation to FIG. 3. The document in FIG. 6A includes various raw contours, such as contours 601, 602, 603, and 604. Contours may be collections of edges, where edges include a collection of pixels with at least one neighboring pixel being assigned a different binarization value. Contour 601, for example, is a horizontal group of pixels assigned a binarization value of 0, indicating black or a background. Neighboring pixels are white, with an assigned binarization value of 1, indicating foreground. Therefore, a contour 601 may be generated on the horizontal collection of pixels. FIG. 6B may be a document or image of a document that has had contours filtered out based on unwanted or undesired shapes, or other possible criteria, as discussed in relation to block 304. For example, contours 603 (contours that trace letters of text) and 604 (isolated contours) may be filtered out as undesired, based on shape or intersections, and may not appear in FIG. 6B. A contour around the letter "e" in contour 603 may be filtered out due to rounded edges. Contour 604 may be filtered out due to its lack of intersections with other contours. In some embodiments, contour analysis module 114 may create documents similar to or the same as the ones shown in FIGS. 6A and 6B.

Figures 7A, 7B:
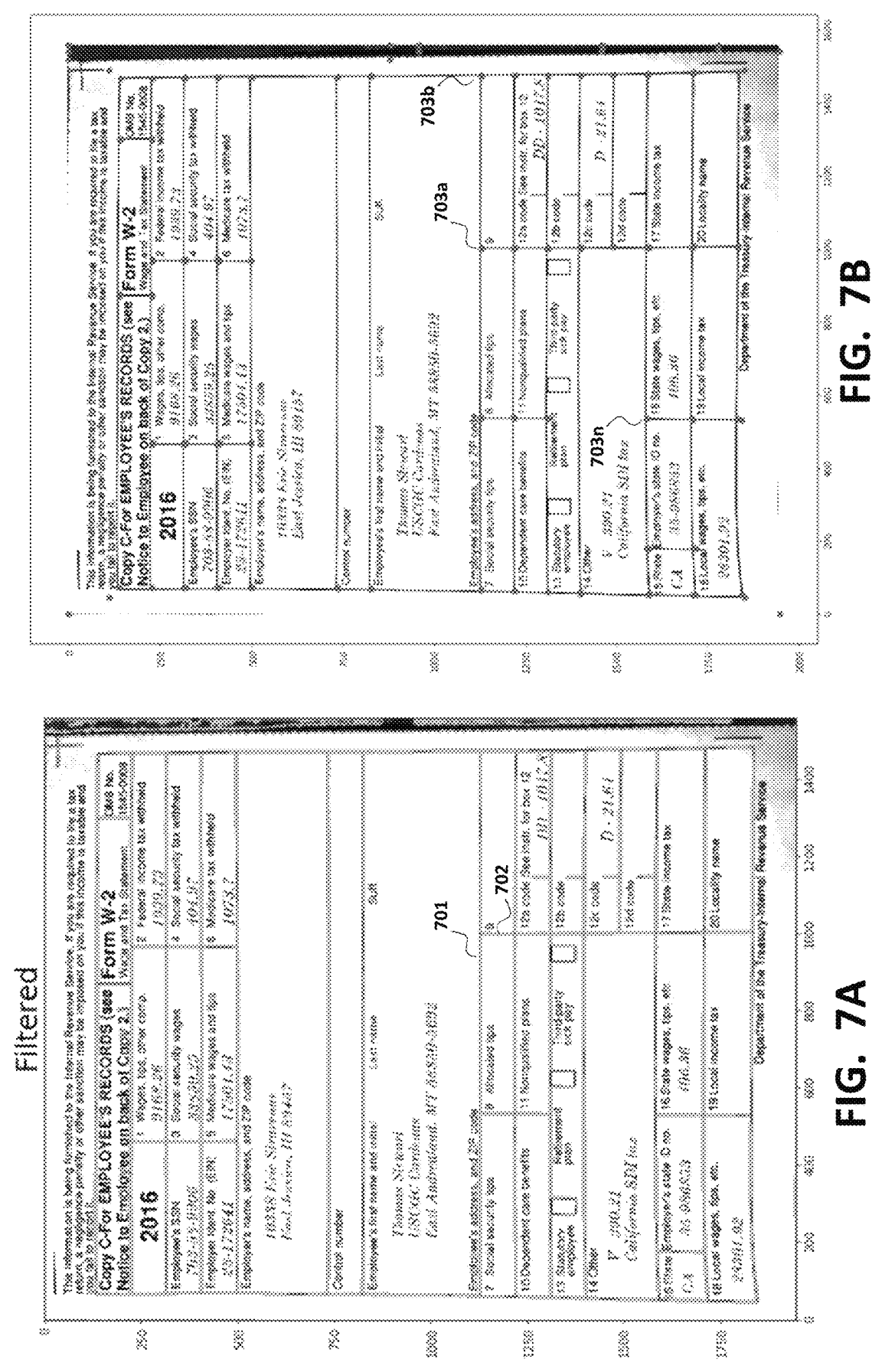

FIGS. 7A and 7B show an example of an image of an example document with synthetic data with generated vertices, according to an embodiment of the present disclosure. FIG. 7A may be a document or image of a document. In some embodiments, the document or image of a document in FIG. 7A may be the same as the one in FIG. 6B. Contours 701 and 702 may be the same as filters 601 and 602 of FIG. 6B, filters that have not been filtered out because of their desired shape and/or intersection characteristics. FIG. 7B may be a document or image of a document in which vertices have been generated on it and denoted with indicators 703a, 703b, . . . , 703n (703 generally); in some embodiments, these vertices may have been generated via block 306 of FIG. 3 or process 400 of FIG. 4. Local scanning may detect contours or streaks intersecting, and this may cause a vertex to be generated at the intersection point. For example, intersecting contours 701 and 702 may be detected via local scanning, causing a vertex to be generated at their intersection point and denoted with a dot 703a, as shown in FIG. 7B. In some embodiments, vertex generation module 116 may generate vertices similar to or the same as the ones shown in FIG. 7B.

Figures 8A, 8B:
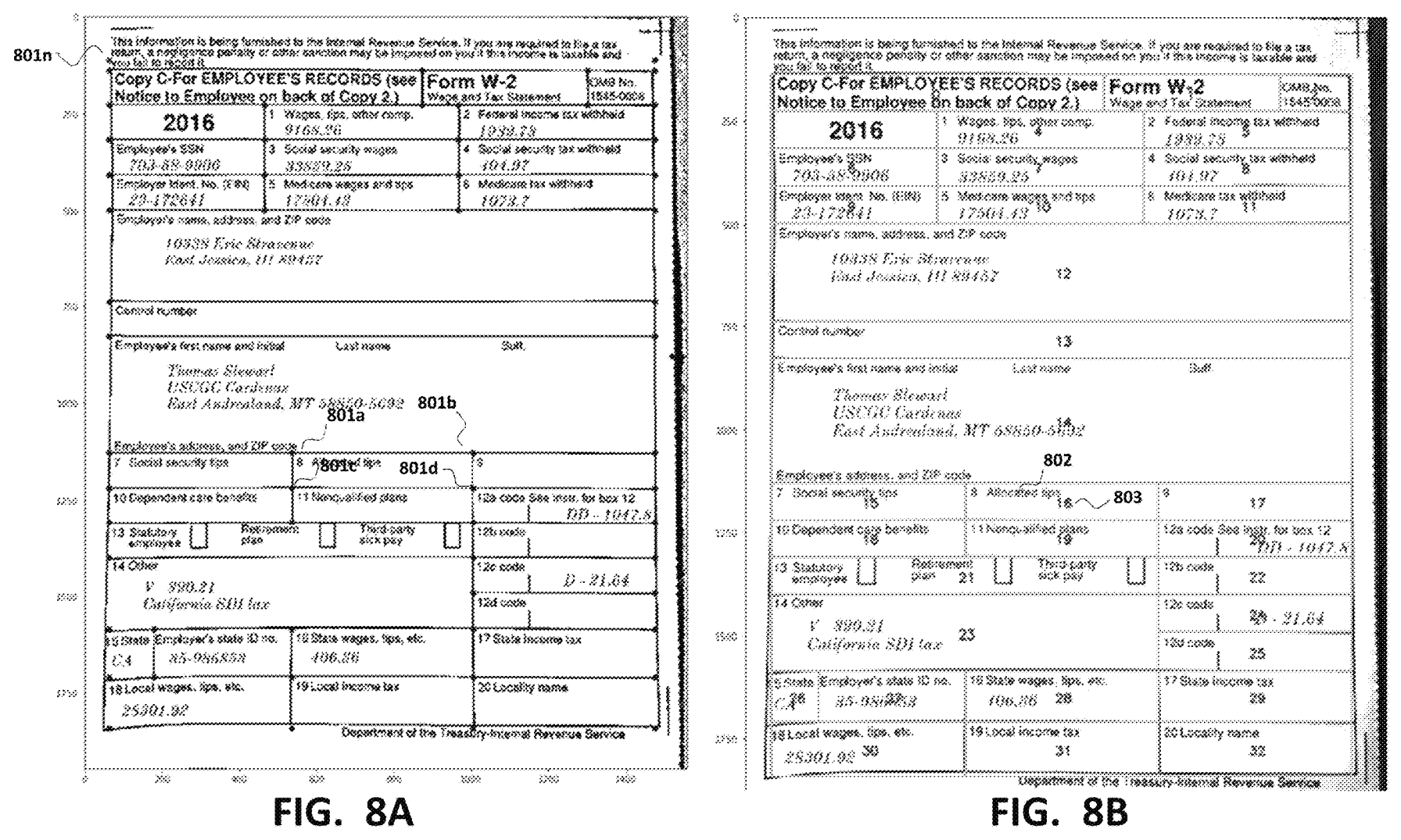

FIGS. 8A and 8B show an example of an image of an example document with synthetic data with patches constructed, according to an embodiment of the present disclosure. FIG. 8A may be a document or image of a document with vertices generated on it; in some embodiments, this may be the document of FIG. 7B. For example, vertices 801a, 801b, . . . , 801n (801 generally) may be the same as the vertices of FIG. 7B. FIG. 8B may be a document or image of a document with patches constructed on it. In some embodiments, the patches may be constructed in the same or similar manner as discussed in relation to block 308 of FIG. 3, where vertices may be preserved and used for patch construction based on analyzing the set of streaks or contours immediately surrounding the vertex. For example, vertices 801a-d contain an acceptable set of streaks (due to the perpendicular intersections of surround contours) and may thus be preserved to create patch 802. In some embodiments, patches may also be numbered, such as number 803 designating match 802 as the 16th patch in the document. Note that, in some embodiments, vertices that do not have acceptable sets of streaks surrounding them, such as vertex 801n of FIG. 8A, may not be used to construct a patch. In some embodiments, each patch may then be individually analyzed with an OCR engine to extract text (e.g. "allocated tips" from patch 802).

Note FIGS. 5-8 contain images of synthetic documents that relate to a fake identity and do not contain any personally identifiable information.

Figure 9:
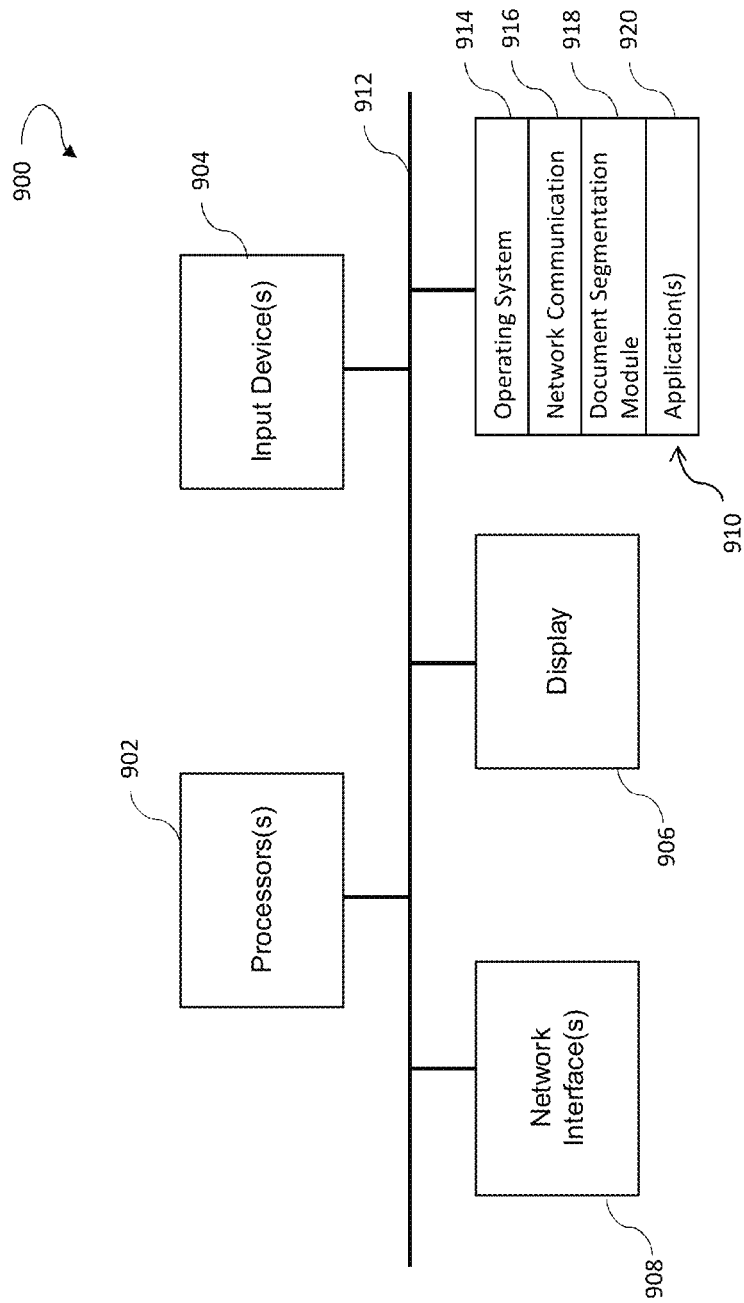
FIG. 9 shows an example server device, according to an embodiment of the present disclosure.

FIG. 9 shows an example server device 900, according to an embodiment of the present disclosure. For example, computing device 900 may perform the functions related to automatic detection of specific data such as sensitive information in clear text described above. The computing device 900 may be implemented on any electronic device that runs software applications derived from compiled instructions, including without limitation personal computers, servers, smart phones, media players, electronic tablets, game consoles, email devices, etc. In some implementations, the computing device 900 may include one or more processors 902, one or more input devices 904, one or more display devices 906, one or more network interfaces 908, and one or more computer-readable mediums 910. Each of these components may be coupled by bus 912, and in some embodiments, these components may be distributed among multiple physical locations and coupled by a network.

Display device 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device 904 may be any known input device technology, including but not limited to a keyboard (including a virtual keyboard), mouse, track ball, and touch-sensitive pad or display. Bus 912 may be any known internal or external bus technology, including but not limited to ISA, EISA, PCI, PCI Express, NuBus, USB, Serial ATA or FireWire. Computer-readable medium 910 may be any medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium 910 may include various instructions 914 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on computer-readable medium 910; controlling peripheral devices (e.g., disk drives, printers, etc.) which may be controlled directly or through an I/O controller; and managing traffic on bus 912. Network communications instructions 916 may establish and maintain network connections (e.g., software for implementing communication protocols, such as TCP/IP, HTTP, Ethernet, telephony, etc.).

Document segmentation module 918 may include instructions for performing the functions related to performing patch-based document segmentation for information extraction as described above, for example one or more portions of the processes illustrated in FIGS. 2-8.

Application(s) 920 may be an application that uses or implements the processes described herein and/or other processes. The processes may also be implemented in operating system 914.

Figure 10:
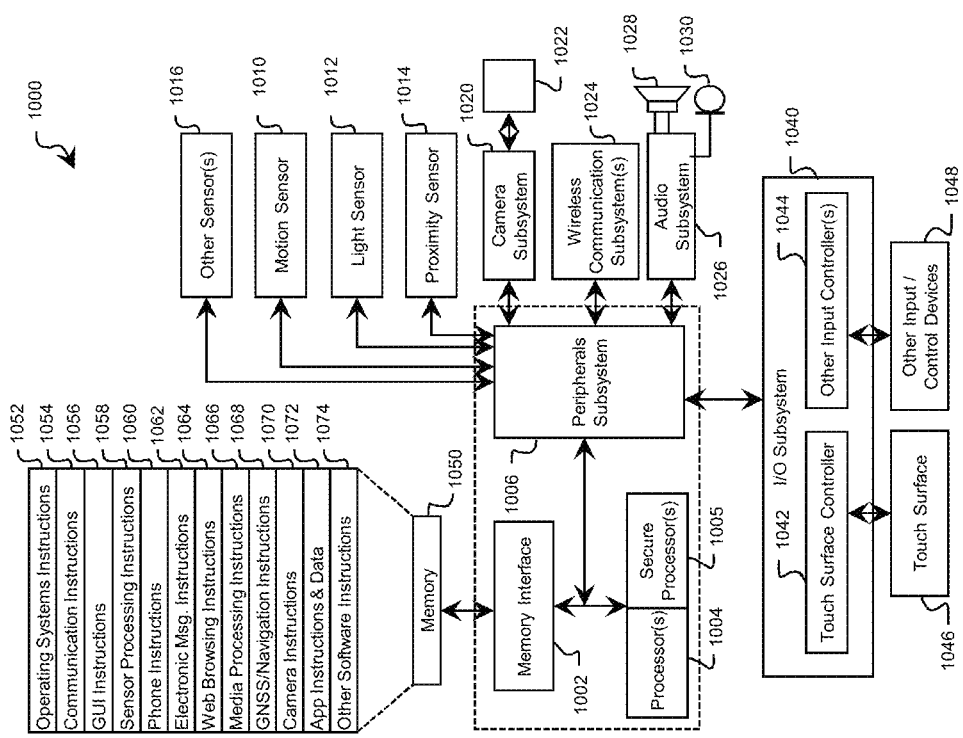
FIG. 10 shows an example computing device, according to an embodiment of the present disclosure.

FIG. 10 shows an example computing device, according to an embodiment of the present disclosure. In some embodiments, device 1000 may be user device 102. The illustrative user device 1000 may include a memory interface 1002, one or more data processors, image processors, central processing units 1004, and/or secure processing units 1005, and peripherals subsystem 1006. Memory interface 1002, one or more processors 1004 and/or secure processors 1005, and/or peripherals subsystem 1006 may be separate components or may be integrated in one or more integrated circuits. The various components in user device 1000 may be coupled by one or more communication buses or signal lines.

Sensors, devices, and subsystems may be coupled to peripherals subsystem 1006 to facilitate multiple functionalities. For example, motion sensor 1010, light sensor 1012, and proximity sensor 1014 may be coupled to peripherals subsystem 1006 to facilitate orientation, lighting, and proximity functions. Other sensors 1016 may also be connected to peripherals subsystem 1006, such as a global navigation satellite system (GNSS) (e.g., GPS receiver), a temperature sensor, a biometric sensor, magnetometer, or other sensing device, to facilitate related functionalities.

Camera subsystem 1020 and optical sensor 1022, e.g., a charged coupled device (CCD) or a complementary metal-oxide semiconductor (CMOS) optical sensor, may be utilized to facilitate camera functions, such as recording photographs and video clips. Camera subsystem 1020 and optical sensor 1022 may be used to collect images of a user to be used during authentication of a user, e.g., by performing facial recognition analysis.

Communication functions may be facilitated through one or more wired and/or wireless communication subsystems 1024, which may include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 1024. The specific design and implementation of communication subsystems 1024 may depend on the communication network(s) over which the user device 1000 is intended to operate. For example, user device 1000 may include communication subsystems 1024 designed to operate over a GSM network, a GPRS network, an EDGE network, a WiFi or WiMax network, and a Bluetooth™ network. For example, wireless communication subsystems 1024 may include hosting protocols such that device 1000 may be configured as a base station for other wireless devices and/or to provide a WiFi service.

Audio subsystem 1026 may be coupled to speaker 1028 and microphone 1030 to facilitate voice-enabled functions, such as speaker recognition, voice replication, digital recording, and telephony functions. Audio subsystem 1026 may be configured to facilitate processing voice commands, voice-printing, and voice authentication, for example.

I/O subsystem 1040 may include a touch-surface controller 1042 and/or other input controller(s) 1044. Touch-surface controller 1042 may be coupled to a touch surface 1046. Touch-surface 1046 and touch-surface controller 1042 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046.

The other input controller(s) 1044 may be coupled to other input/control devices 1048, such as one or more buttons, rocker switches, thumb-wheel, infrared port, USB port, and/or a pointer device such as a stylus. The one or more buttons (not shown) may include an up/down button for volume control of speaker 1028 and/or microphone 1030.

In some implementations, a pressing of the button for a first duration may disengage a lock of touch-surface 1046; and a pressing of the button for a second duration that is longer than the first duration may turn power to user device 1000 on or off. Pressing the button for a third duration may activate a voice control, or voice command, module that enables the user to speak commands into microphone 1030 to cause the device to execute the spoken command. The user may customize a functionality of one or more of the buttons. Touch-surface 1046 may, for example, also be used to implement virtual or soft buttons and/or a keyboard.

In some implementations, user device 1000 may present recorded audio and/or video files, such as MP3, AAC, and MPEG files. In some implementations, user device 1000 may include the functionality of an MP3 player, such as an iPod™. User device 1000 may, therefore, include a 36-pin connector and/or 8-pin connector that is compatible with the iPod. Other input/output and control devices may also be used.

Memory interface 1002 may be coupled to memory 1050. Memory 1050 may include high-speed random access memory and/or non-volatile memory, such as one or more magnetic disk storage devices, one or more optical storage devices, and/or flash memory (e.g., NAND, NOR). Memory 1050 may store an operating system 1052, such as Darwin, RTXC, LINUX, UNIX, OS X, Windows, or an embedded operating system such as VxWorks.

Operating system 1052 may include instructions for handling basic system services and for performing hardware dependent tasks. In some implementations, operating system 1052 may be a kernel (e.g., UNIX kernel). In some implementations, operating system 1052 may include instructions for performing voice authentication.

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 10100 to facilitate phone-related processes and functions; electronic messaging instructions 1062 to facilitate electronic messaging-related process and functions; web browsing instructions 1064 to facilitate web browsing-related processes and functions; media processing instructions 1066 to facilitate media processing-related functions and processes; GNSS/Navigation instructions 1068 to facilitate GNSS and navigation-related processes and instructions; and/or camera instructions 1070 to facilitate camera-related processes and functions.

Memory 1050 may store application (or "app") instructions and data 1072, such as instructions for the apps described above in the context of FIGS. 1, 2A, 2B, 2C, 3, 4, and 5. Memory 1050 may also store other software instructions 1074 for various other software applications in place on device 1000.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for extracting information from a document comprising:
   receiving, from a user device associated with a user, a document associated with the user;
   performing, by at least one processor, patch-based document segmentation on the received document to form a plurality of patches on the received document;
   extracting, by the at least one processor, text from each patch of the plurality of patches;
   analyzing, by the at least one processor, the extracted text from each patch to detect a field value;
   sending, by the at least one processor, the field value of each patch to the user device with instructions to display at least one field value on a user interface.

2. The method of claim 1, wherein performing patch-based document segmentation comprises:
   performing binarization on the received document;
   in response to performing binarization, generating contours on the received document;
   generating vertices on the document using the contours; and constructing the plurality of patches using the contours and vertices.

3. The method of claim 2, wherein performing binarization on the received document comprises performing adaptive binarization on the received document.

4. The method of claim 2, wherein generating contours on the received document comprises:
generating contours using a border following technique;
identifying a plurality of shapes formed by the contours, wherein each shape has an associated span;
analyzing the plurality of shapes and their associated spans; and
in response to analyzing the plurality of shapes and their associated spans, filtering out contours that form undesired shapes.

5. The method of claim 2, wherein generating vertices using the generated contours comprises:
scanning a first region around each generated contour, wherein the first region includes a grid of pixels with a pre-determined size and an intensity assigned to each pixel;
scanning a second region around each generated vertex, wherein the second region includes a grid of pixels with a second pre-determined size and an intensity assigned to each pixel;
analyzing the intensities in the region to detect a streak;
preserving vertices with an acceptable set of streaks in its associated region, wherein an acceptable set of streaks comprises at least two streaks perpendicularly intersecting; and
aligning the preserved vertices to form a grid of vertices.

6. The method of claim 5, comprising discarding a vertex in response to detecting a set of streaks that are farther than a pre-determined distance from the vertex.

7. The method of claim 1, wherein extracting text from each patch of the plurality of patches is performed using an optical character recognition (OCR) engine.

8. The method of claim 1, wherein analyzing the extracted text from each patch to detect a field value comprises analyzing the patch with a machine learning model trained to recognize the field value based on textual features and spatial coordinates.

9. A method for extracting information from a document comprising:
obtaining, by a user device, a document associated with a user;
sending, by the user device, the obtained document to a server, wherein the server is configured to:
receive, by at least one processor, the document from the user device;
perform, by the at least one processor, patch-based document segmentation on the received document to form a plurality of patches on the received document;
extract, by the at least one processor, text from each patch of the plurality of patches;
analyze, by the at least one processor, the extracted text from each patch to detect a field value; and
send, by the at least one processor, the field value of each patch to the user device with instructions to display at least one field value on a user interface;
receiving, by the user device, the field value of each patch and instructions to display at least one field value on a user interface; and
displaying the at least one field value on the user interface.

10. The method of claim 9, wherein obtaining the document associated with the user comprises taking, by the device associated with the user, photographs of the document.

11. The method of claim 9, wherein obtaining the document associated with the user comprises:
scanning the document; and
uploading the scanned document to the user device.

12. The method of claim 9, wherein performing patch-based document segmentation comprises:
performing binarization on the received document;
in response to performing binarization, generating contours on the received document;
generating vertices on the document using the contours; and
constructing patches using the contours and vertices.

13. The method of claim 12, wherein performing binarization on the received document comprises performing adaptive binarization on the received document.

14. The method of claim 12, wherein generating contours on the received document comprises:
generating contours using a border following technique;
identifying a plurality of shapes formed by the contours, wherein each shape has an associated span;
analyzing the plurality of shapes and their associated spans; and
in response to analyzing the plurality of shapes and their associated spans, filtering out contours that form undesired shapes.

15. The method of claim 12, wherein generating vertices using the generated contours comprises:
scanning a first region around each generated contour, wherein the first region is a grid of pixels with a pre-determined size and an intensity assigned to each pixel;
scanning a second region around each generated vertex, wherein the second region is a grid of pixels with a second pre-determined size and an intensity assigned to each pixel;
analyzing the intensities in the region to detect a streak;
preserving vertices with an acceptable set of streaks in its associated region, wherein an acceptable set of streaks comprises at least two streaks perpendicularly intersecting; and
aligning the preserved vertices to form a grid of vertices.

16. The method of claim 15 comprising discarding a vertex in response to detecting a set of streaks that are farther than a pre-determined distance from the vertex.

17. The method of claim 9, wherein extracting text from each patch of the plurality of patches is performed using an optical character recognition (OCR) engine.

18. The method of claim 9, wherein analyzing the extracted text from each patch to detect a field value comprises analyzing the patch with a machine learning model trained to recognize a field value based on textual features and spatial coordinates.

19. The method of claim 9, wherein displaying the at least one field value on a user interface comprises accepting changes, via a user interface, to the at least one field value from the user.

20. A system comprising:
a user device associated with a user, wherein the user device is configured to:
obtain a document associated with the user;
send the obtained document to a server; and
display at least one field value on a user interface;
a server comprising at least one processor; and a non-transitory, computer-readable medium comprising instructions thereon which, when executed by the at least one processor, cause the at least one processor to execute a process operable to:

receive, by the at least one processor, a document from a user device;

perform, by the at least one processor, patch-based document segmentation on the received document to form a plurality of patches on the received document;

extract, by the at least one processor, text from each patch of the plurality of patches;

analyze, by the at least one processor, the extracted text from each patch to detect a field value;

send, by the at least one processor, the field value of each patch to the user device with instructions to display the at least one field value on the user interface.

* * * * *